Figure 1:
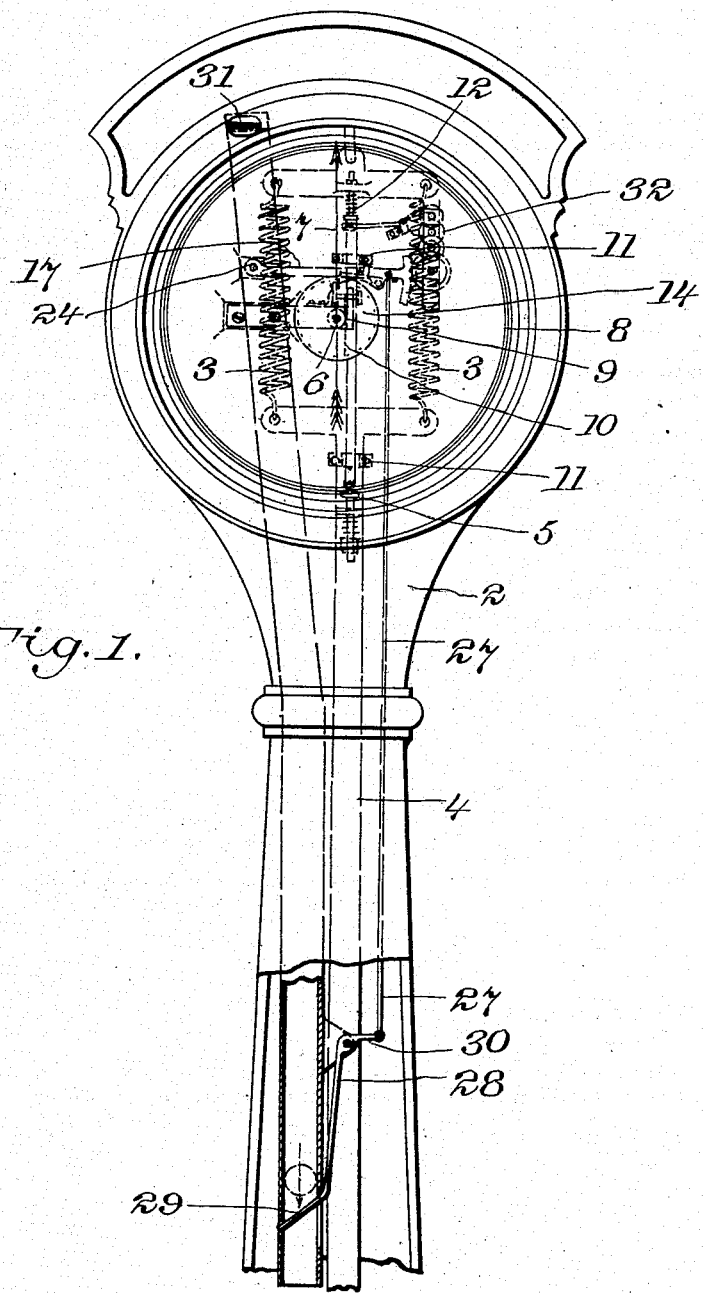

No. 675,078. Patented May 28, 1901.
L. W. BALDWIN.
COIN OPERATED WEIGHING MACHINE.
(Application filed July 13, 1900.)

(No Model.) 3 Sheets—Sheet 1.

WITNESSES:

INVENTOR
Leroy W. Baldwin
BY
ATTORNEY

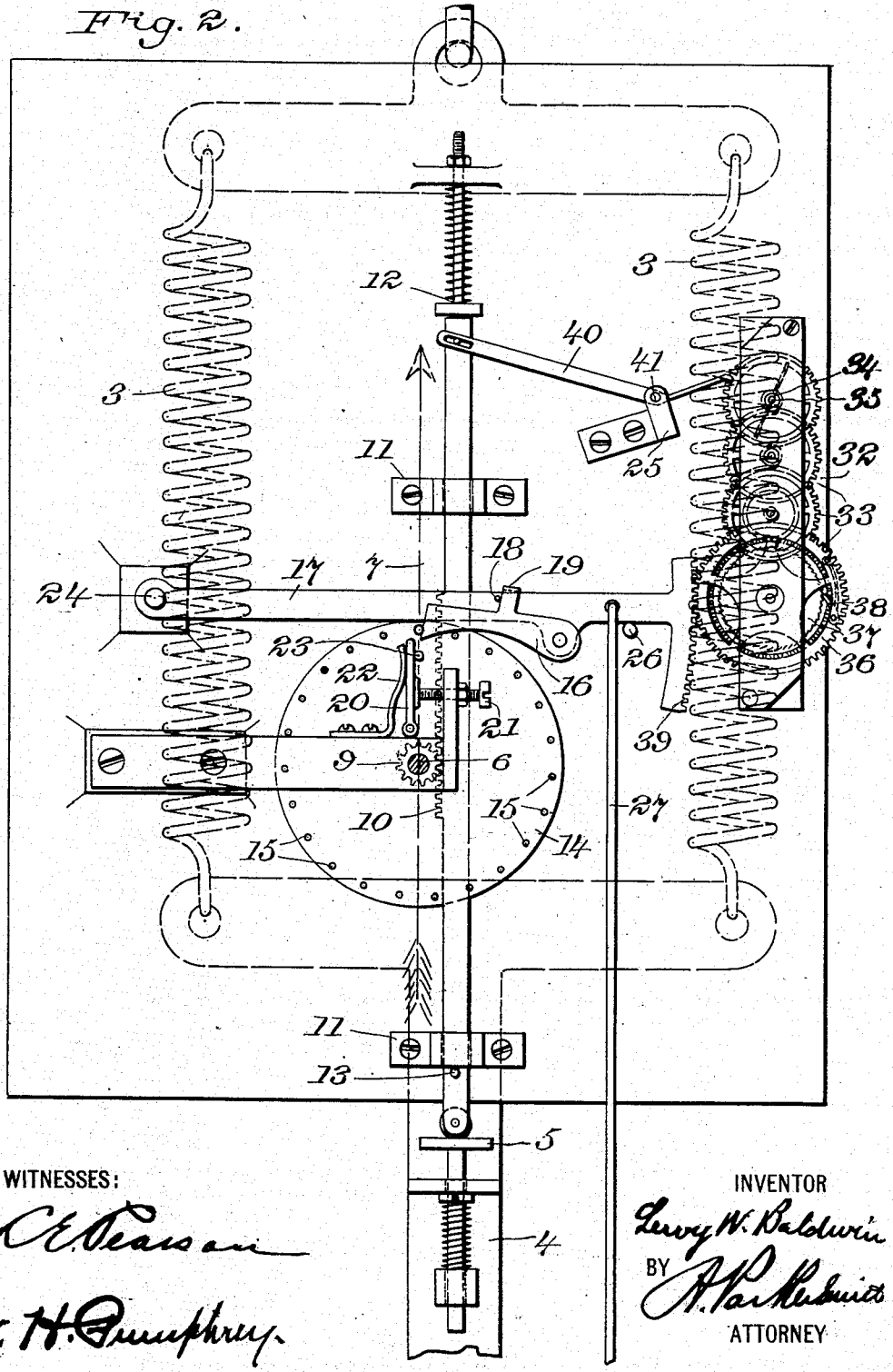

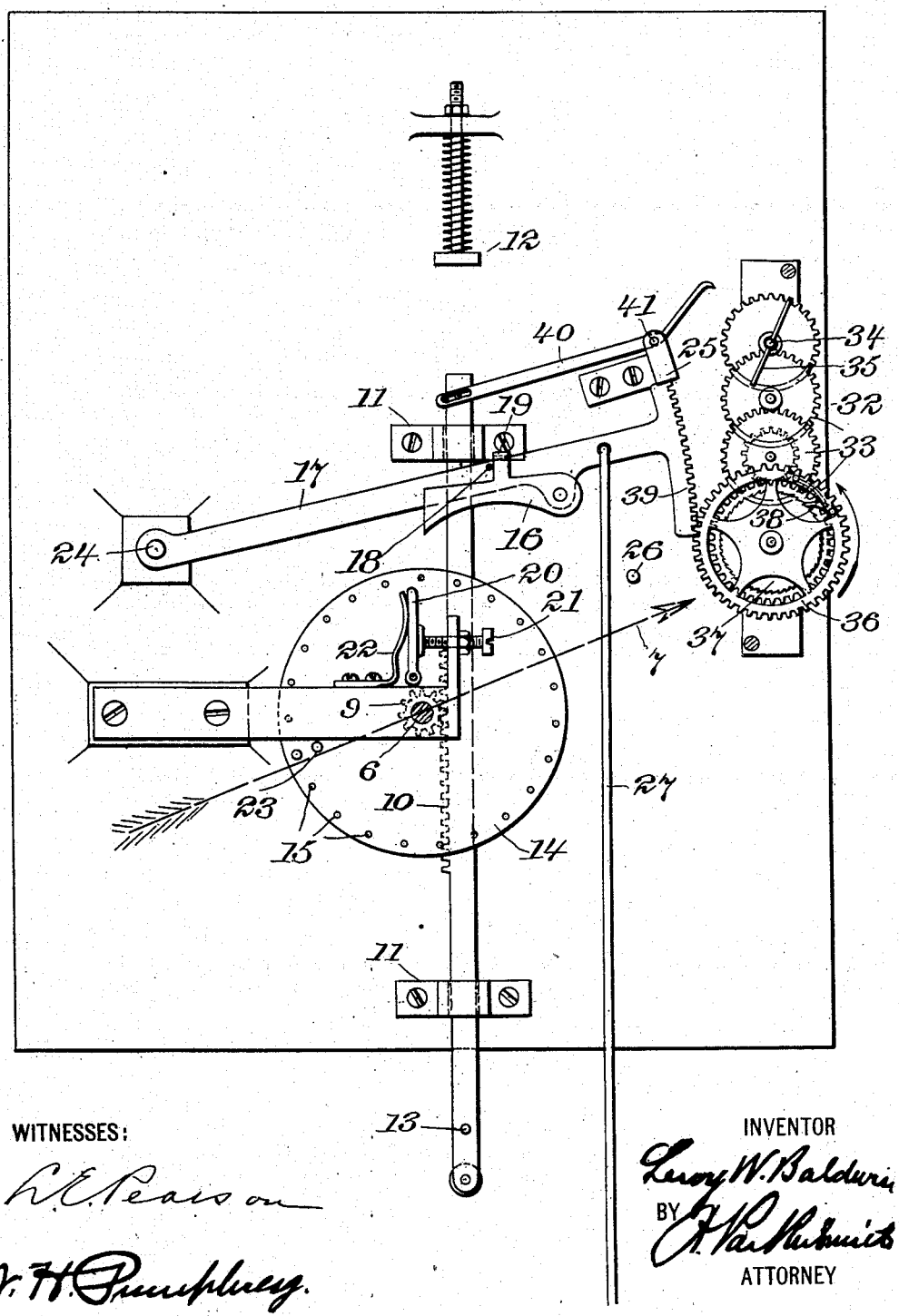

UNITED STATES PATENT OFFICE.

LEROY W. BALDWIN, OF NEW YORK, N. Y.

COIN-OPERATED WEIGHING-MACHINE.

SPECIFICATION forming part of Letters Patent No. 675,078, dated May 28, 1901.

Application filed July 13, 1900. Serial No. 23,441. (No model.)

*To all whom it may concern:*

Be it known that I, LEROY W. BALDWIN, a citizen of the United States of America, and a resident of New York city, county of New York, State of New York, have invented certain new and useful Improvements in Coin-Operated Weighing-Machines, of which the following is a specification.

My invention relates generally to weighing-machines, and is more specifically designed to produce an improved form of coin-controlled indicator for use therein.

The preferred form of mechanism embodying my invention is illustrated in the accompanying three sheets of drawings, in which—

Figure 1 is a view in elevation of a complete machine, the indicating mechanism of which is represented by dotted lines and the casing thereof broken away to more clearly show the coin-tripped lever and its arrangement in the coin-chute. Fig. 2 is an enlarged view in elevation of the indicating mechanism, together with the weighing-springs and the upper end portion of the weighing-rod, all parts being shown in their normal position; and Fig. 3 is a similar view with the weighing springs and rod omitted and the mechanism shown adjusted to a weight-indicating position.

Throughout the several views of the drawings like reference characters indicate corresponding parts.

Referring to the drawings, 1 represents a well-known type of platform-scale, such as is ordinarily employed in machines of this class, the same being inclosed in a casing 2 of suitable design, &c. The scale-levers (not shown) located in the base-casting of the machine are connected with the weighing-springs 3 3, in the head-casting thereof, by means of a rod 4, which latter is provided with a rigid or spring-sustained lug or projection 5, adapted to coöperate with the rack-bar of the indicating mechanism as a stop in limiting its downward movement, as will be hereinafter described. The indicating mechanism (best shown in Figs. 2 and 3) comprises a main shaft 6, upon one end of which is mounted the index or pointer 7 in operative relation to the face of the dial 8. This shaft also carries a pinion 9, fast thereon and meshing with a rack-bar 10, which latter is vertically movable in guides 11 11. The upward movement of the rack-bar is checked by the yielding spring-buffer 12 and positively limited by the stop-pin 13 thereof engaging the lower face of the bottom guide, as shown in Fig. 2. The downward movement of the rack-bar varies according to the weight upon the scale-platform and is thus limited by the rigid or spring-seated stop 5 of the weighing-rod in the well-known manner. Normally the lower end of the rack-bar rests upon the stop of the weighing-rod, but is not supported thereby, a separate device independent of the scale mechanism being provided to sustain the rack normally—*i. e.*, in an elevated position—and from which it may be released by a coin in a manner to be hereinafter described. This device comprises a disk 14, fast upon and rotating with the index-shaft, which is provided with a plurality of studs or pins 15, axially disposed and arranged in a circular series adjacent to the circumference thereof. A gravity-pawl 16, carried by a pivoted lever 17, lies normally in operative relation to the disk and coöperates with the pins thereof in locking the disk against rotation toward the right—that is to say, from movement in the direction to indicate weight—but at the same time permitting free rotation of the disk in the reverse direction. This pawl has its upward movement limited by a stud 18, and its downward movement likewise limited by an integral projection 19, which overhangs the upper side of the lever 17.

To insure a full return of the index or pointer and prevent its coming to rest on one side or the other of the zero-point after the machine has performed an operation and the person has stepped from the platform, an adjustable stop is employed to coöperate with the index-shaft, which consists of a pivoted lever 20, adjustable by means of a set-screw 21, acting upon the lever in opposition to a spring 22 which latter yieldingly sustains the stop-lever against the impact of the stop-pin 23 of the disk as the pin moves into engagement therewith. The lever 17, pivoted at 24, has a limited movement between stops 25 26 and through a rod 27 is operatively connected with a coin-operated device of any well-known form or construction. In the present instance I employ a simple form of bell-crank lever 28, the long arm 29 of which is arranged in operative relation to the coin-chute, as indicated in Fig. 1. Upon the passage of a coin this bell-crank lever is caused to swing outwardly, thereby carrying its short arm 30, the rod 27, and free end of the lever 17 upward to the position shown in Fig. 3. In the upward movement of the lever 17 the dog mounted thereon is carried clear of the studded disk on the index-shaft, leaving the same free to rotate under the influence of its actuating device—i. e., the rack-bar. Assuming that a person has stepped upon the platform, the weighing-rod will at once descend and come to rest in a position determined by his weight, and the spring-seated stop upon the rod moving downward therewith will clear the lower end of the rack-bar—that is to say, the scale-levers and counterbalancing-springs will become adjusted and are normally free to become so adjusted to the weight upon the platform before a coin is inserted. To complete the operation or obtain an indication of the amount of the weight, it is necessary to release the indicating mechanism, which is effected by the introduction of a coin in the slot 31. (See Fig. 1.) In passing downward through the chute the coin trips the crank-lever and through the connecting-rod causes the pawl-carrying lever 17 to swing upward and disengage the latch or locking device of the index-shaft, and thereupon the rack-bar, in engagement with the pinion, falls by its own weight until checked by the stop of the weighing-rod and in its downward movement by reason of its engagement with the pinion imparts motion to the index-shaft, causing the latter to rotate a distance proportionate to the travel of the rack and indicate upon the dial the amount of the weight upon the platform.

After the pawl-carrying lever 17 has been swung upward to disengage the latch or locking device it is essential that the same should be maintained thus disengaged temporarily to allow a proper interval of time for the fall of the rack-bar and the resulting rotation of the index-shaft to the weight-indicating position. It is also equally important that the latch should reëngage without loss of time to prevent continued forward movement of the index or pointer after it has come to rest at a point upon the dial indicating the amount of weight upon the platform, thereby preventing more than one correct indication of weight for each coin inserted. To effect this, I employ a retarding device 32, of a well-known fan-governor type, which is arranged to coöperate with the pawl-carrying lever. This device comprises a train of multiplying-gearing 33, connected to drive the governor-shaft 34, upon which the fan 35 is mounted. The first gear 36 of the train is loose upon its shaft, but operatively connected through a ratchet 37 and pawl 38 to transmit motion thereto and drive the same when rotating toward the left or in the direction indicated by the arrow in Fig. 3. This gear meshes with a curved rack 39, formed in part with the pawl-carrying lever, and is driven and in turn drives the governor-train as the levers 17 28 and their connecting-rod resume their normal position or travel downward from the position shown in Fig. 3 to that shown in Fig. 2. It is during the interval of time required for the latch to again come into locking relation with the studded disk that the rack-bar falls, causing the index or pointer to move over the dial to a weight-indicating position, and on coming to a state of rest is sustained thus adjusted by the latch reëngaging with the disk-studs.

A lever 40, pivoted at 41, coöperates with the gear of the governor-shaft as a brake and is adjusted into or out of engagement therewith by having its long arm connected with the rack-bar. This brake, forming a connection between the retarding device and the indicating mechanism, serves to retain the locking-pawl in the position to which it is elevated by the action of the inserted coin until both the weighing and indicating mechanisms operate, thereby enabling a person who contrary to directions first inserts a coin to subsequently mount the platform and obtain an indication of his weight—that is to say, when the machine is at rest the brake engages and locks the retarding device and is maintained in this relation by the rack-bar while the latter is elevated or in its normal position. Upon the descent of the rack-bar, however, the brake is thrown off, leaving the retarding device free to operate in checking the advance of the locking-dog. It will thus be seen that when there is no weight upon the platform a coin may be inserted and the locking-dog disengaged without in any manner influencing or changing the position of the brake, the release of which may be brought about only by the downward movement of the rack-bar from its normal position to the point of adjustment of the weighing-rod stop.

Briefly, the operation is as follows: A person wishing to be weighed steps upon the platform and instantly the scale-levers, springs, &c., become adjusted to his weight and the weighing-rod descends, carrying its stop downward clear of the rack-bar, as above described. To complete the operation or obtain an indication of the weight, a coin is inserted in the slot and in passing through the chute trips the lower crank-lever and through the connecting-rod causes the pawl-carrying lever to swing upwardly and disengage the latch, thereby releasing the index-shaft. The rack then falls by its own weight and in rotating this shaft carries the index over the dial until checked by the weighing-rod stop, at which point the index comes to rest, and thereby indicates the amount of the weight upon the platform. It will be evident that the resistance to the upward movement of the pawl-carrying lever is reduced to a minimum through the employment of a ratchet connection between the first gear of the train and its shaft. In the descent of the rack-bar the governor-brake is thrown off, leaving the train free to operate under the weight of the pawl-carrying lever, &c., and the latch or dog is thereby gradually returned into locked relation with the studded disk to prevent further rotation or movement of the index beyond the point indicating the amount of the weight originally upon the platform. The return of the dog into effective position serves to prevent another person from joining the first upon the platform and obtaining an additional indication of their combined weight, &c. As the person steps from the platform the rack-bar in engagement with the stop of the weighing-rod is carried upward to its normal position and in turn reverses the rotation of the indicator-shaft and causes the pointer to swing back to the zero-point of the dial.

The advantages of my invention consist in maintaining the proper sequence in the operation of the parts by causing the latch when tripped by a coin to remain set for operation until released by the action of the scale mechanism, which thereby enables a person who, contrary to directions, first inserts a coin before stepping upon the platform to subsequently mount the same and obtain a correct indication of his weight. Furthermore, the invention possesses advantages by reason of the extreme simplicity and durability of the mechanism, together with its effectiveness in preventing attempted fraud and its accuracy in indicating weight.

I do not wish to be understood as limiting myself to the exact construction, &c., herein illustrated and described, as various changes may be made without departing from the spirit and scope of my invention. Other forms of locking device might be employed and the same tripped by a hand or automatically-operated mechanism acting through the medium of a coin. The form of retarding device and brake might be changed both as to its structure and point of application to the pawl-carrying lever, &c.; but all such changes I would consider obvious modifications and entirely within the present invention.

Having therefore described my invention, I claim—

1. In a weighing-machine, the combination with indicating mechanism, of a coin-operated lock for the indicator, and a connection between the lock and said mechanism, whereby the reëngagement of the lock is controlled.

2. In a weighing-machine, the combination with indicating mechanism, of a coin-operated lock for the indicator, a connection between the lock and said mechanism, and means whereby the reëngagement of the lock is controlled to occur subsequent to the operation of the indicator.

3. In a weighing-machine, the combination with indicating mechanism, of a coin-operated lock for the indicator, a device for retarding the reëngagement of the lock and a connection between said retarding device and indicating mechanism, whereby the reëngagement of the lock is controlled.

4. In a weighing-machine, the combination with indicating mechanism, of a coin-operated lock for the indicator, a device for retarding the reëngagement of the lock, said device being normally held from operating and controlled by the indicating mechanism.

5. In a weighing-machine, the combination with indicating mechanism, of a coin-operated lock for the indicator, a device for retarding the reëngagement of the lock and a brake for said device operated by the indicating mechanism.

6. In a weighing-machine, the combination with indicating mechanism, of a coin-operated lock for the indicator, a device for retarding the reëngagement of the lock and a normally applied brake for said device operated by the indicating mechanism.

7. In a weighing-scale, the combination of the indicator-shaft, an actuating device therefor, a coin-controlled lock operatively connected with the shaft, a retarding device for the lock, and means whereby the retarding device is controlled by the shaft-actuating device.

8. In a weighing-scale, the combination of the indicator-shaft, a weighted body, operatively connected to actuate said shaft, means whereby the movement of the weighted body varies as the weight upon the scale, a coin-controlled lock coöperating with the shaft, a retarding device and means whereby the retarding device is controlled by said weighted body for checking the reëngagement of the lock.

9. In a weighing-scale, the combination of the indicator-shaft and its pinion, a rack-bar meshing with the pinion of the indicator-shaft, means whereby the movement of the rack-bar varies as the weight upon the scale, a coin-controlled lock coöperating with the shaft, a retarding device, and means whereby the retarding device is controlled by the rack-bar for checking the reëngagement of the lock.

10. In a weighing-scale, the combination of the indicator-shaft and its pinion, an independent rack-bar meshing with the pinion of the indicator-shaft, means whereby the movement of the independent rack-bar varies as the weight upon the scale, a coin-controlled lock coöperating with the shaft, a retarding device, and means whereby the retarding device is controlled by the rack-bar for checking the reëngagement of the lock.

11. In a weighing-scale, the combination with the indicating mechanism, of a lock for said mechanism, comprising a coin-tripped dog, a series of engaging projections carried by the indicator-shaft with which said dog cooperates and a retarding device operatively arranged to check the reëngagement of said dog with the shaft projections.

12. In a weighing-scale, the combination with the indicating mechanism, of a lock for said mechanism, comprising a coin-tripped dog, a toothed disk carried by the indicator-shaft and with which said dog coöperates, and a retarding device checking the reëngagement of the dog with said toothed disk.

13. In a weighing-scale, the combination with the indicating mechanism, of a lock for said mechanism, comprising a coin-tripped dog, a studded disk carried by the indicator-shaft and with which said dog coöperates normally in limiting said disk to rotate in one direction, and a retarding device checking the reëngagement of the dog with said toothed disk.

14. In a weighing-scale, the combination with the indicating mechanism, of a lock for said mechanism, comprising a coin-tripped dog, a studded disk carried by the indicator-shaft and with which said dog coöperates normally in limiting said disk to rotate in one direction, a stop for the disk, and a retarding device checking the reëngagement of the dog with said toothed disk.

15. In a weighing-scale, the combination with the indicating mechanism, of a lock for said mechanism, comprising a coin-tripped dog, a studded disk carried by the indicator-shaft and with which said dog coöperates normally in limiting said disk to rotate in one direction, a spring-sustained stop for the disk, and a retarding device checking the reëngagement of the dog with said toothed disk.

16. In a weighing-scale, the combination with the indicating mechanism, of a lock for said mechanism, comprising a coin-tripped lever, a dog carried by said lever, a toothed disk on the indicator-shaft, and with which said dog coöperates, and a retarding device checking the movement of the lever when advancing the dog into locked relation with the disk.

17. In a weighing-scale, the combination with the indicating mechanism, of a lock for said mechanism, comprising a coin-tripped lever, a gravity-dog pivotally secured upon said lever, and having limited independent play, a toothed disk on the indicator-shaft, and with which said dog coöperates, and a retarding device checking the movement of the lever when advancing the dog into locked relation with the disk.

18. In a weighing-scale, the combination with the indicating mechanism, of a lock for said mechanism, comprising a gravity-lever, a coin-trip therefor, a dog pivotally secured upon said lever and having limited independent play, a toothed disk on the indicator-shaft and with which said dog coöperates, and a retarding device checking the movement of the lever when advancing the dog into locked relation with the disk.

19. In a weighing-scale, the combination with the indicating mechanism, of a lock for said mechanism, comprising a gravity-lever having a limited movement, a coin-trip for elevating the lever, a dog pivotally secured upon said lever and having limited independent play, a toothed disk on the indicator-shaft and with which said dog coöperates, and a retarding device checking the movement of the lever when advancing the dog into locked relation with the disk.

20. In a weighing-scale, the combination with the indicating mechanism, of a lock for said mechanism, comprising a coin-tripped lever, a dog carried by said lever, a toothed disk on the indicator-shaft, and with which said dog coöperates, and a retarding device checking the movement of the lever when advancing the dog into locked relation with the disk, together with an automatic brake for the retarding device.

21. In a weighing-scale, the combination with the indicating mechanism, of a lock for said mechanism, comprising a coin-tripped lever, a dog carried by said lever, a toothed disk on the indicator-shaft, and with which said dog coöperates, and a retarding device checking the movement of the lever when advancing the dog into locked relation with the disk, together with a brake for the retarding device operated by the indicating mechanism.

22. In a weighing-scale, the combination with the indicating mechanism, of a lock for said mechanism, comprising a coin-tripped lever, a dog carried by said lever, a toothed disk on the indicator-shaft and with which said dog coöperates, and a governor geared to check the movement of the lever when advancing the dog into locked relation with the disk.

23. In a weighing-scale, the combination with the indicating mechanism, of a lock for said mechanism, comprising a coin-tripped lever, a dog carried by said lever, a toothed disk on the indicator-shaft and with which said dog coöperates, and a ratchet-geared governor checking the movement of the lever only when advancing the dog into locked relation with the disk.

24. In a weighing-scale, the combination with the indicating mechanism, of a lock for said mechanism, comprising a coin-tripped lever, a dog carried by said lever, a toothed disk on the indicator-shaft and with which said dog coöperates, and a ratchet-geared governor checking the movement of the lever only when advancing the dog into locked relation with the disk, together with a governor-brake controlled by the indicating mechanism.

Signed at New York this 11th day of July, 1900.

LEROY W. BALDWIN.

Witnesses:
W. H. PUMPHREY,
A. PARKER-SMITH.